United States Patent
Tung et al.

(10) Patent No.: US 7,339,902 B2
(45) Date of Patent: Mar. 4, 2008

(54) REPEATER FOR PERFORMING AUTO-NEGOTIATION BETWEEN TWO NODE DEVICES IN A NETWORK

(75) Inventors: Jiann-Shjun Tung, TaiChung (TW); Ming-Ta Tung, ChuPei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1043 days.

(21) Appl. No.: 10/442,066

(22) Filed: May 21, 2003

(65) Prior Publication Data

US 2003/0218990 A1 Nov. 27, 2003

(30) Foreign Application Priority Data

May 24, 2002 (TW) .............................. 91110978 A (51) Int. Cl.
*H04B 7/14* (2006.01)
(52) U.S. Cl. .................................... 370/279; 370/293
(58) Field of Classification Search ................ 370/276, 370/277, 278, 279, 293, 294, 295, 296, 280, 370/281
See application file for complete search history.

(56) References Cited

U.S. PATENT DOCUMENTS

| 5,872,781 | A | * | 2/1999 | Bennett et al. ............. 370/365 |
| 6,584,109 | B1 | * | 6/2003 | Feuerstraeter et al. ...... 370/401 |
| 7,111,104 | B2 | * | 9/2006 | Chen et al. ................. 710/306 |
| 2004/0264498 | A1 | * | 12/2004 | Feuerstraeter et al. ...... 370/465 |

* cited by examiner

Primary Examiner—Ajit Patel
(74) Attorney, Agent, or Firm—Troxell Law Office, PLLC (57) ABSTRACT

The present invention provides a repeater and associated method for performing auto-negotiation between two node devices in the Ethernet network. The repeater includes a receiver receiving related information of auto-negotiation of a first node device, a control unit processing the received information and determining a common mode of operation for the first node device and the repeater, and a transmitter transmitting a determining result to a second node device. The associated method includes selecting a first common mode of operation according to respective modes supported by the first node device and the repeater; comparing the first common mode with modes supported by the second node device; and determining a second common mode of operation according to a comparing result, wherein the second common mode is the highest performance common mode of operation for the first and second node devices.

13 Claims, 8 Drawing Sheets

REPEATER FOR PERFORMING AUTO-NEGOTIATION BETWEEN TWO NODE DEVICES IN A NETWORK

BACKGROUND OF THE INVENTION (a). Field of the Invention

The present invention relates in general to auto-negotiation in a network, and more particularly to a repeater and associated method for performing auto-negotiation between two node devices in the network.

(b). Description of the Prior Arts

A host computer usually connects to a local area network (LAN) via a network interface card (NIC). For an Ethernet network, there are several available technologies, such as 10Base-TX, 100Base-TX, and 100Base-FX. The PHY of the NIC capable of these technologies supports detection of capabilities of a connected network node and determination of a highest performance mode of operation between them. This function is called auto-negotiation and defined in IEEE 802.3u standard.

A mode of operation of a NIC comprises data rate (e.g. 10 Mbps or 100 Mbps), Half/Full Duplex, and flow control. Full Duplex mode means that the NIC can perform data reception and transmission on a network simultaneously, while Half Duplex mode means that the NIC can only perform one of data reception and transmission in the same period of time. Flow control refers to the capability to control the traffic on the network.

The auto-negotiation function allows two connected node devices to automatically detect the PHYs each other, thereby knowing modes of operation supported by the opposite side and determining the highest performance common mode between them. A node device, such as a NIC or a switch, can configure an auto-negotiation advertisement register (ANAR) in the PHY through a serious management interface of media independent interface (MII), wherein the ANAR is used to record related information to be advertised to remote devices from the host device such that the remote devices can know the capabilities of the host device when performing auto-negotiation.

Figure 1:
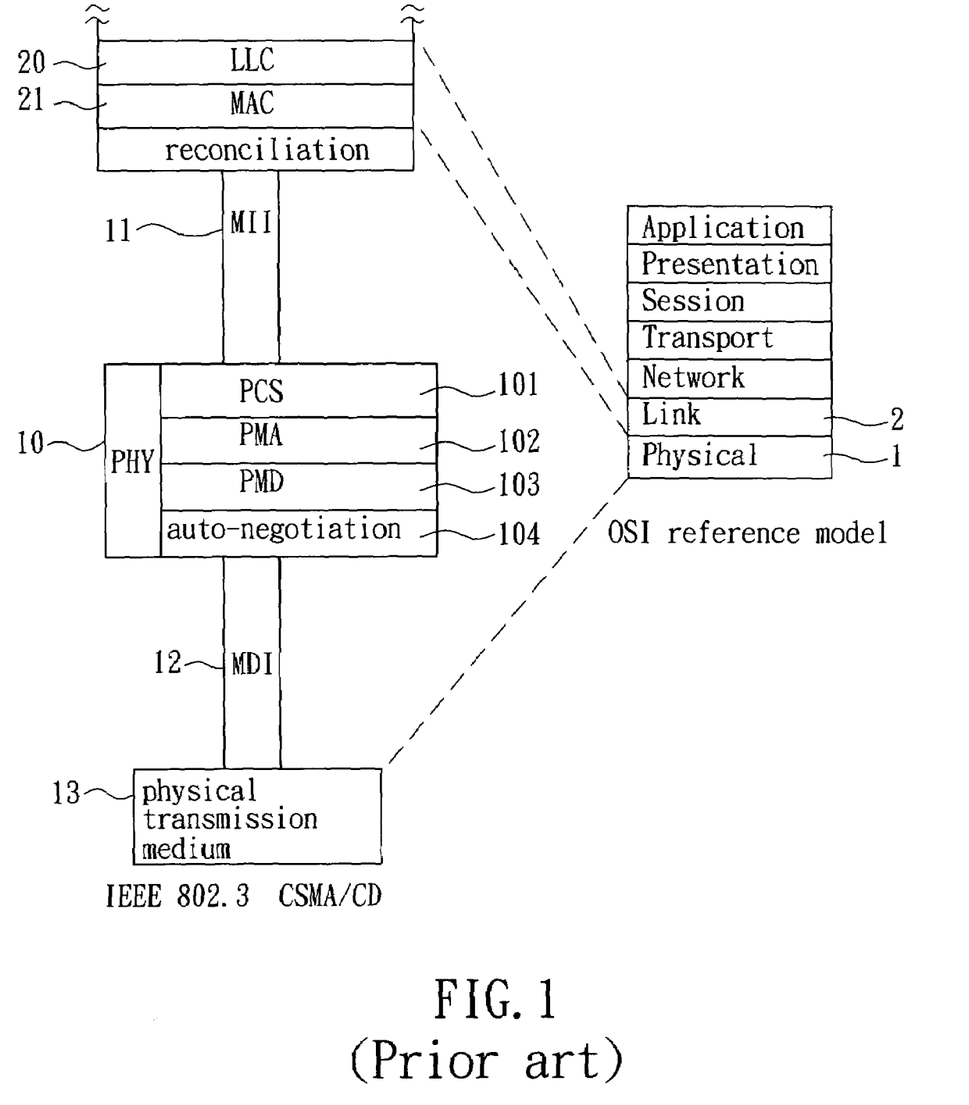
FIG. 1 is a diagram illustrating protocol implementation for auto-negotiation in an Ethernet network.

FIG. 1 is a diagram illustrating protocol implementation for auto-negotiation in an Ethernet network. As shown in the right of FIG. 1, the Open System Interconnection (OSI) reference model, which is the most commonly used layering model for network, comprises a Physical layer 1, a Link layer 2 and other layers. In the left of FIG. 1, the Physical layer 1 and the Link layer 2 correspond to respective layers used in CSMA/CD of IEEE 802.3, and auto-negotiation is implemented in the Physical layer 1 of the OSI model. A PHY device 10 is located between a media independent interface 11 and a media dependent interface (MDI) 12. The MDI 12 connects to other network devices via a physical transmission line 13. The Link layer 2 comprises a logic link control (LLC) layer 20 and a media access control (MAC) layer 21.

The PHY 10 comprises a physical coding sublayer (PCS) 101, a physical medium attachment (PMA) layer 102, a physical medium dependent (PMD) layer 103, and an auto-negotiation layer 104 which detects other PHYs when performing auto-negotiation. The details of auto-negotiation are further described in IEEE 802.3 standard.

Figure 2A:
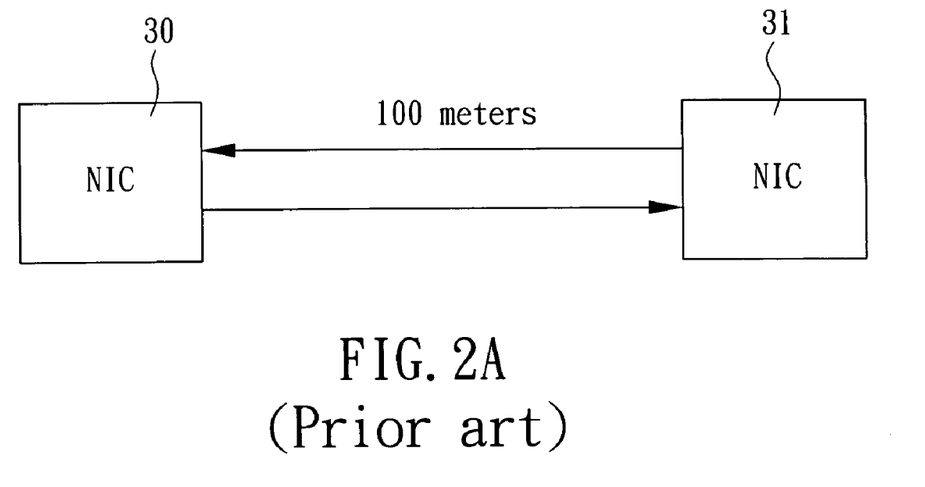
FIGS. 2a and 2b are diagrams showing the maximal allowable distance between two nodes in an Ethernet network.
Figure 2B:
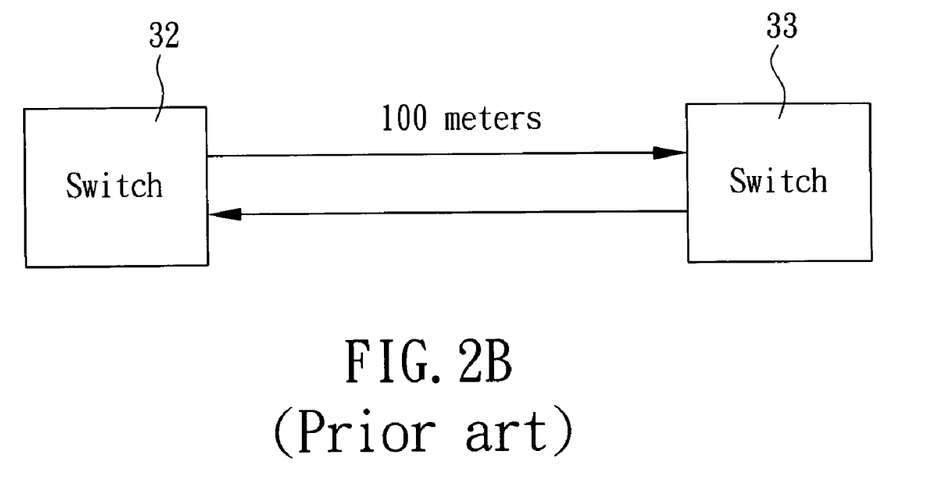

In an Ethernet network, the maximal allowable distance between two nodes is only 100 meters. As shown in FIGS. 2a and 2b, the distance between NICs 30, 31 and between switches 32, 33 is limited to within 100 meters. Therefore, a repeater (or several repeaters) is needed to maintain a network connection between two distant nodes, e.g. a host computer and a remote server.

However, a conventional repeater can only strengthen signals and is incapable of auto-negotiation. If a node connected to the conventional repeater changes its data rate, e.g. from 10Base-TX to 100Base-TX, the data rate would be still limited to 10 Mbps since the conventional repeater cannot perform auto-negotiation to adjust its own data rate. At this time, a manual adjustment would be needed to change the data rate of the conventional repeater to 100 Mbps if the conventional repeater also supports a 100 Mbps data rate.

SUMMARY OF THE INVENTION

The first object of the present invention is to provide a method for performing auto-negotiation between two node devices in an Ethernet network, wherein at least a repeater capable of auto-negotiation is used to connect the two node devices. The method includes selecting a first common mode of operation according to respective modes of operation supported by a first node device and the repeater; comparing the first common mode of operation with modes of operation supported by a second node device; and determining a second common mode of operation according to a comparing result, wherein the second common mode of operation is the highest performance common mode of operation for the first and second node devices.

The second object of the present invention is to provide a repeater which is capable of auto-negotiation and connects a first node device and a second node device in an Ethernet network. The repeater includes a receiver receiving related information of auto-negotiation of the first node device; a control unit coupled to the receiver, processing the received information and determining a common mode of operation for the first node device and the repeater; and a transmitter coupled to the control unit, transmitting a determining result to the second node device.

DETAILED DESCRIPTION OF THE PRESENT INVENTION

The present invention provides a method for performing auto-negotiation between two node devices in an Ethernet network, wherein at least a repeater capable of auto-negotiation is used to connect the two node devices. The method includes selecting a first common mode of operation according to respective modes of operation supported by a first node device and the repeater; comparing the first common mode of operation with modes of operation supported by a second node device; and determining a second common mode of operation according to a comparing result, wherein the second common mode of operation is the highest performance common mode of operation for the first and second node devices.

Figure 3:
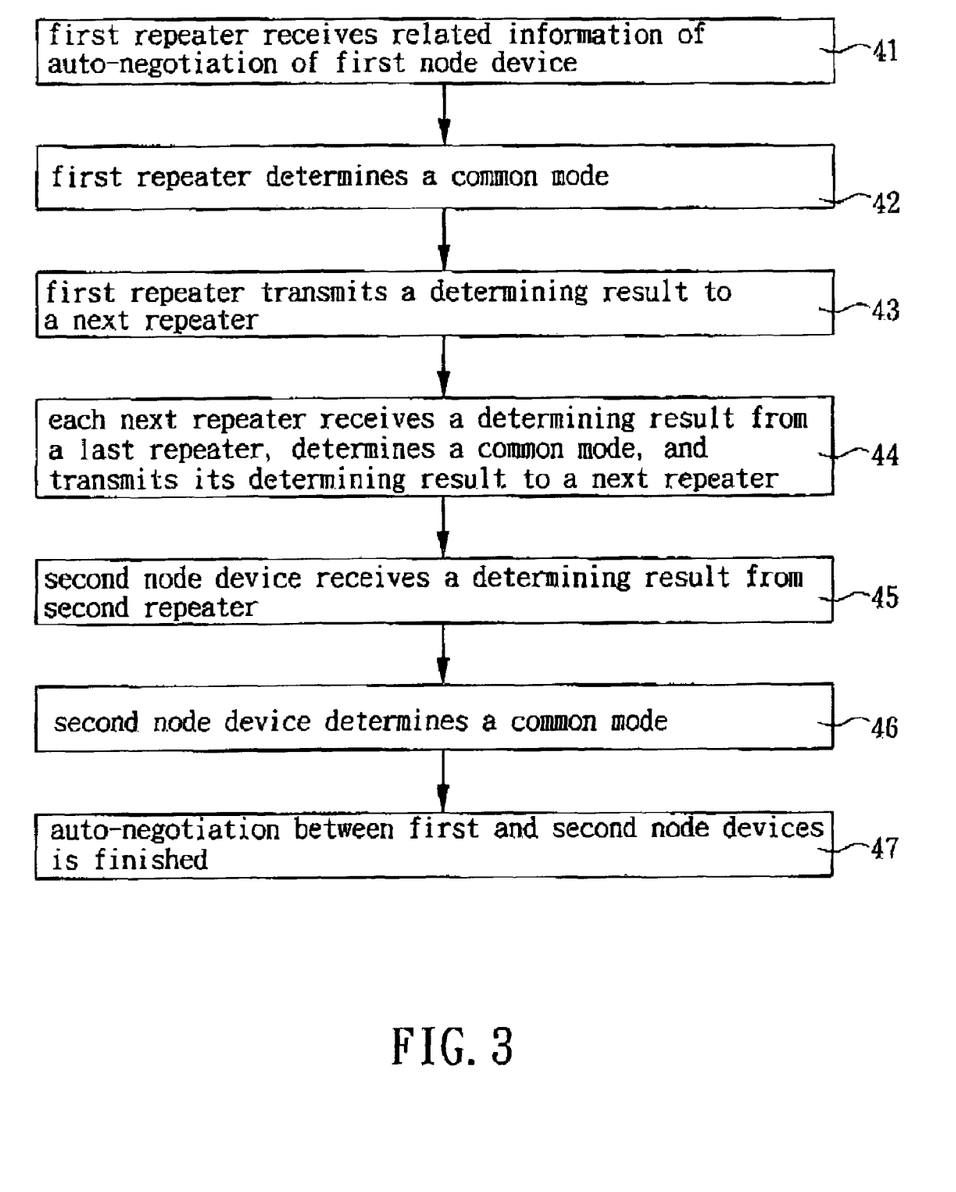
FIG. 3 is a flowchart of the method of the present invention for cases with several repeaters lying between two node devices.

The above method can be applied to cases with several repeaters lying between two node devices. FIG. 3 is a flowchart of the above method for these cases according to the present invention, on condition that a first node device changes its mode of operation or is just connected to a first repeater. As shown in FIG. 3, the method comprises steps of:

41 the first repeater receiving related information of auto-negotiation of the first node device;

42 the first repeater determining a common mode of operation for itself and the first node device according to the received information;

43 the first repeater transmitting a determining result of the step 42 to a next repeater;

44 each next repeater receiving a determining result from a last repeater, determining a proper common mode of operation for itself and the last repeater according to the received result, and then transmitting its determining result to a next repeater;

45 a second node device receiving a determining result from a second repeater;

46 the second node device determining a common mode of operation for itself and the second repeater according to the received result; and 47 auto-negotiation between the first and second node devices finished.

The common mode of operation determined in the step 46 is the highest performance common mode between the first and second node devices. In addition, each repeater (including the first and second repeater) would send back a result to a last device (repeater or the first node device) after determining a common mode of operation for itself and the last device. Then, the last device can conform itself to the common mode of operation based on the sent result. By performing the steps 41-47, not only can the distance between two Ethernet nodes be extended, but auto-negotiation function between them is also maintained.

Figure 4:
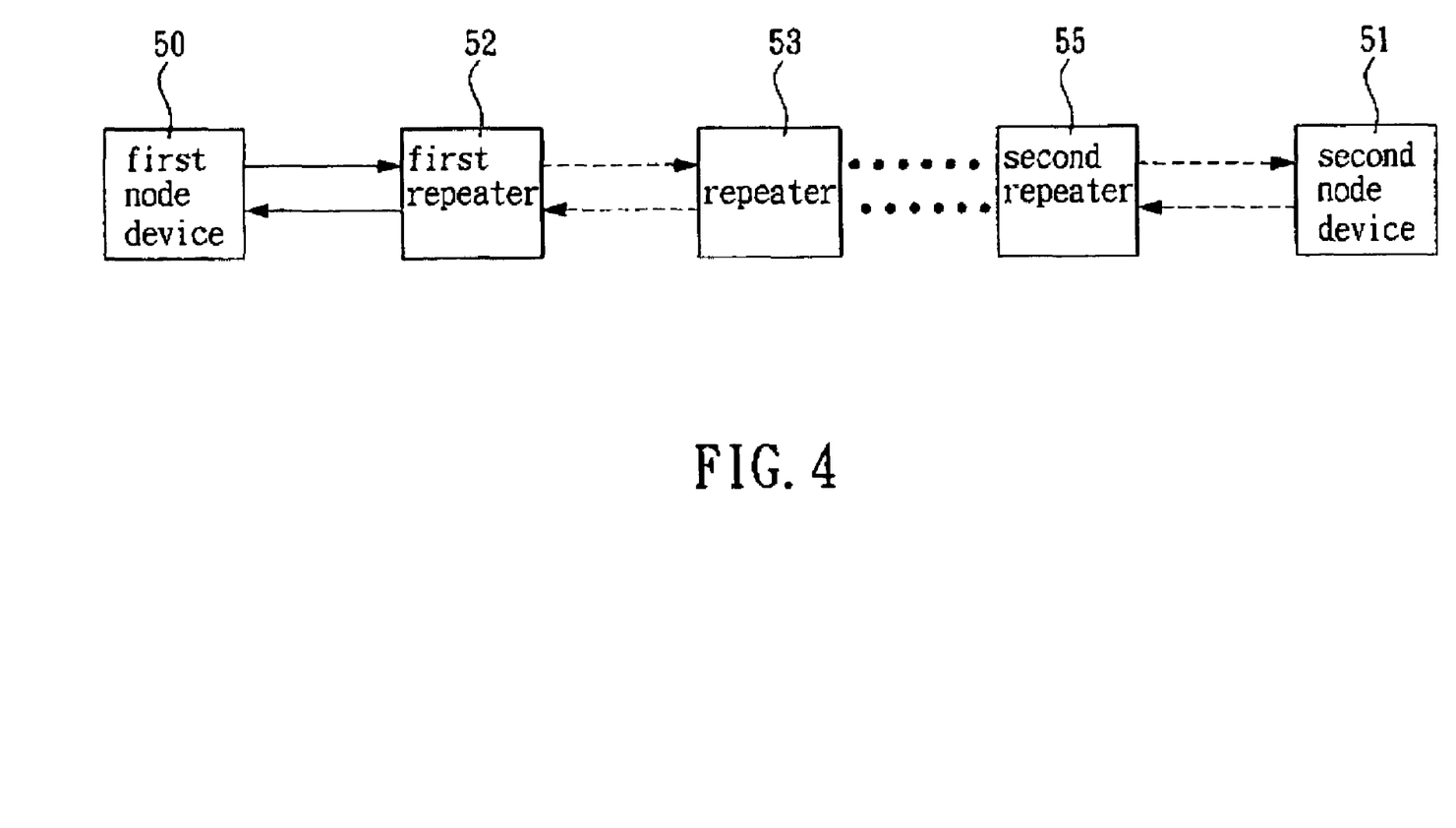
FIG. 4 is a block diagram of network architecture implementing the method of FIG. 3.
Figure 5A:
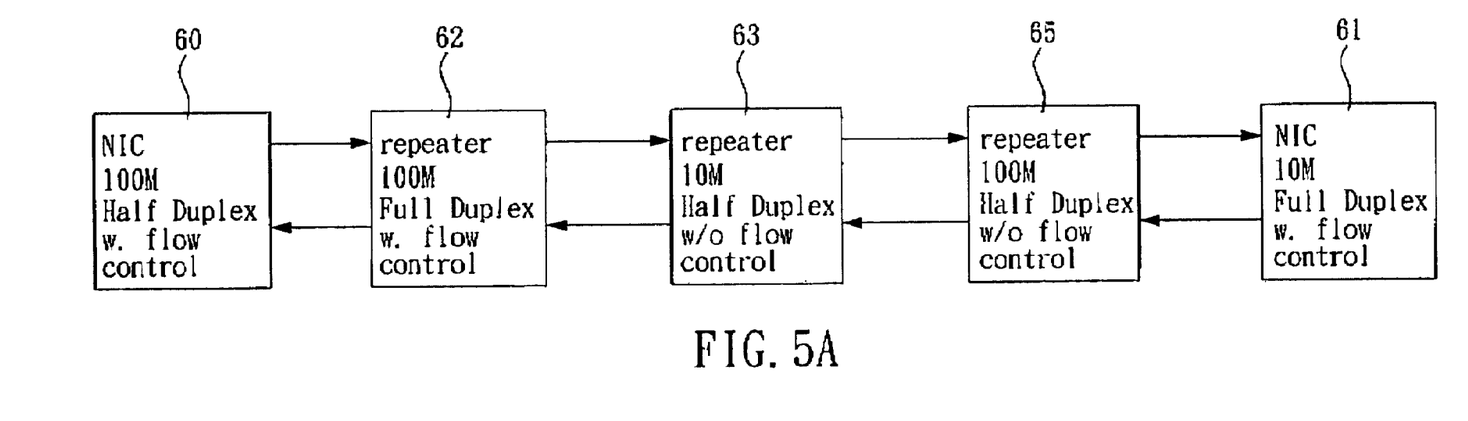
FIGS. 5a and 5b are block diagrams showing an example of operation of the network architecture of FIG. 4.
Figure 5B:
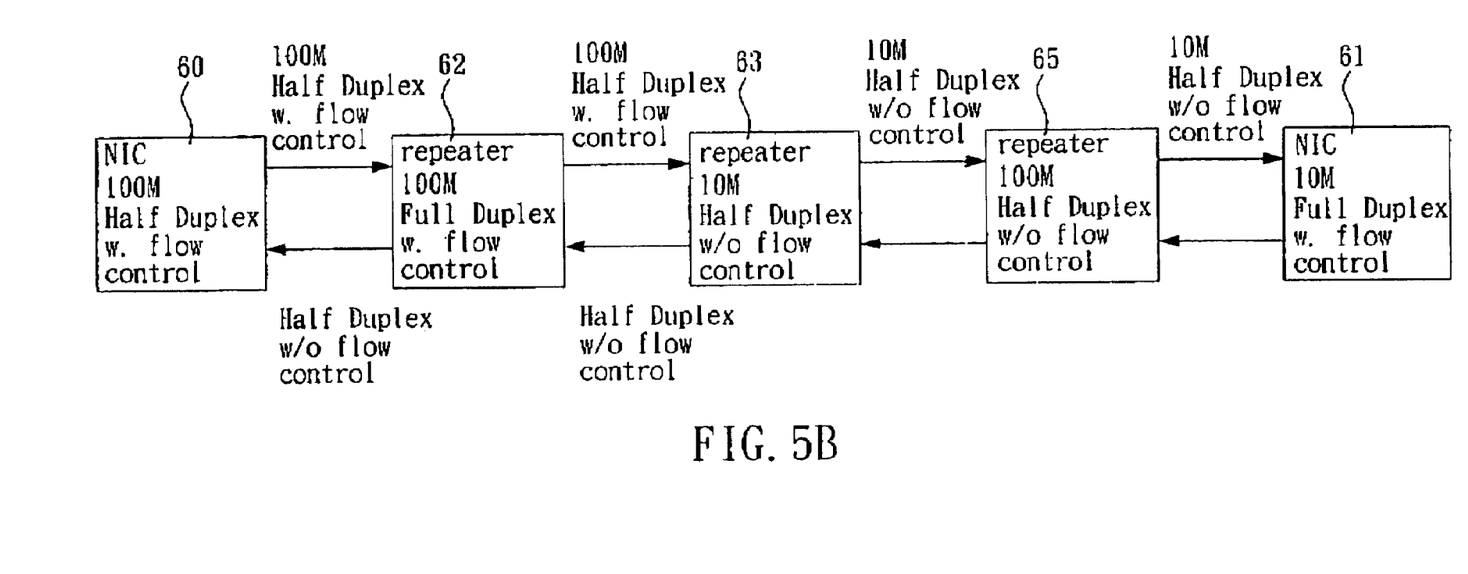

FIG. 4 is a block diagram of network architecture implementing the method of FIG. 3. In FIG. 4, the first node device 50 and the second node device 51 can be a NIC or switch. FIGS. 5a and 5b show an example of operation of the network architecture of FIG. 4. As shown in FIG. 5a, a NIC 60 is configured as 100 Mbps, Half Duplex, and capable of flow control. A repeater 62 is configured as 100 Mbps, Full Duplex, and capable of flow control. A repeater 63 is configured as 10 Mbps, Half Duplex, and incapable of flow control. A repeater 65 is configured as 100 Mbps, Half Duplex, and incapable of flow control. A NIC 61 is configured as 10 Mbps, Full Duplex, and capable of flow control.

Please refer to FIG. 5b. Based on the flowchart of FIG. 3, the repeater 62 determines a common mode of operation, i.e. 100 Mbps, Half Duplex, and capable of flow control, for itself and the NIC 60 when receiving related information of auto-negotiation of the NIC 60. Then, the repeater 62 transmits the determining result to the repeater 63. Following the same process, the repeater 63 determines a common mode of 10 Mbps, Half Duplex, and incapable of flow control for itself and the repeater 62, while the repeater 65 determines a common mode of 10 Mbps, Half Duplex, and incapable of flow control for itself and the repeater 63. Finally, the NIC 61 determines a common mode of 10 Mbps, Half Duplex, and incapable of flow control for itself and the repeater 65. This common mode of operation determined by the NIC 61 is then the highest performance mode for both the NICs 60 and 61.

Figure 6A:
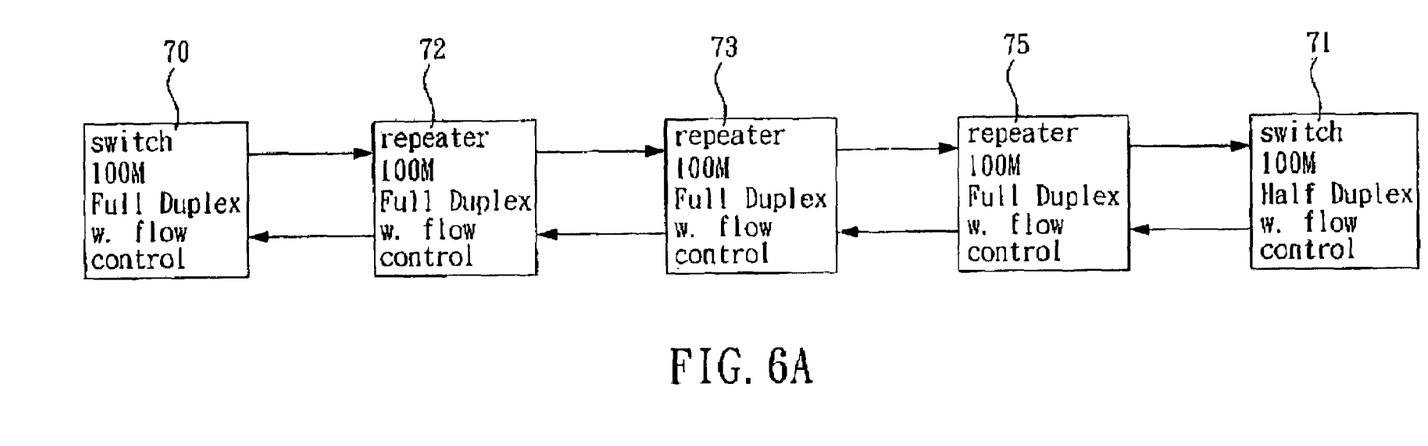
FIGS. 6a and 6b are block diagrams showing another example of the operation of the network architecture of FIG. 4.
Figure 6B:
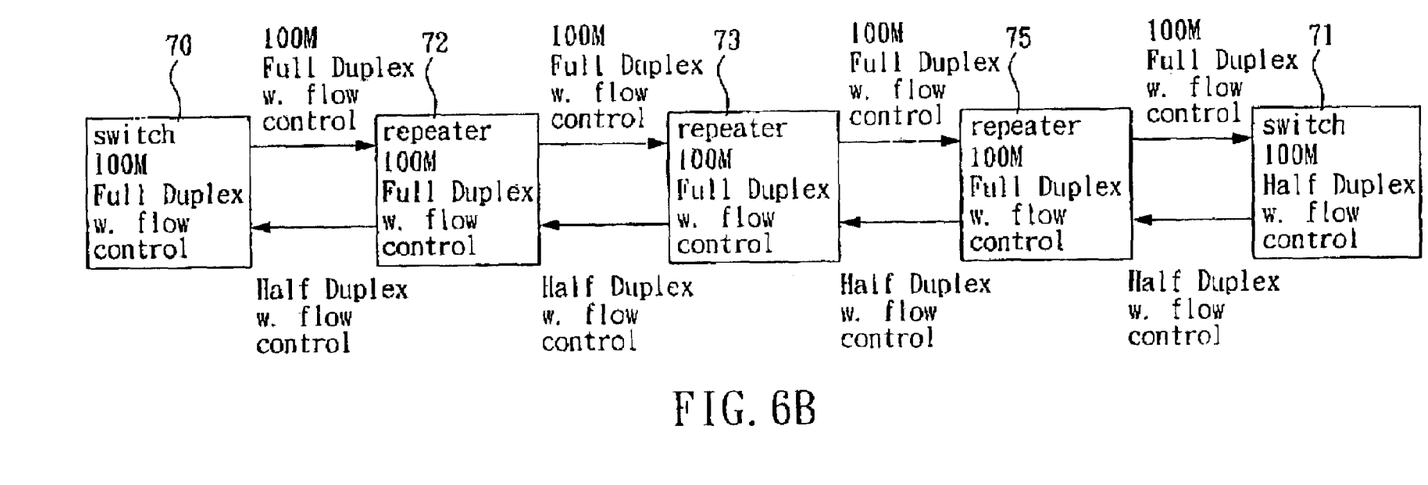

FIGS. 6a and 6b show another example of the operation of the network architecture of FIG. 4. As shown in FIG. 6a, a switch 70 is configured as 100 Mbps, Full Duplex, and capable of flow control. Repeaters 72, 73, and 75 are all configured as 100 Mbps, Full Duplex, and capable of flow control, while a switch 71 is configured as 100 Mbps, Half Duplex, and capable of flow control. Based on the auto-negotiation procedure of FIG. 3, the highest performance common mode for the switches 70 and 71 is 100 Mbps, Half Duplex, and capable of flow control.

Figure 7:
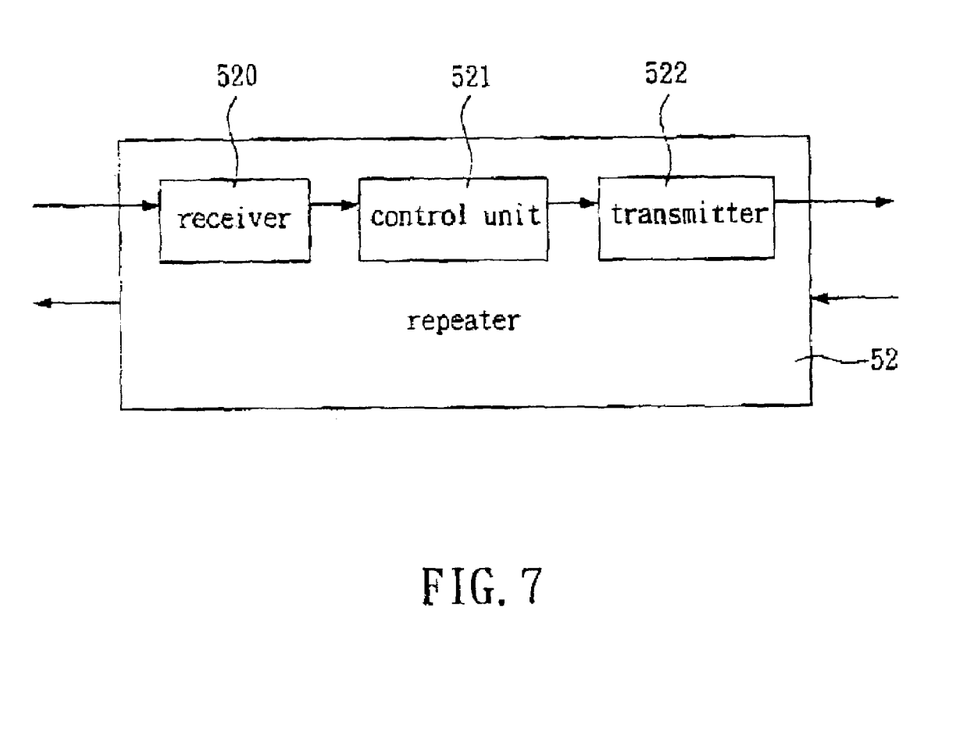
FIG. 7 is a block diagram depicting the interior of a repeater capable of auto-negotiation according to the present invention.

FIG. 7 is a block diagram depicting the interior of the repeater 52 of FIG. 4 according to the present invention. As shown in FIG. 7, the repeater 52 comprises a receiver 520, a control unit 521 coupled to the receiver 520, and a transmitter 522 coupled to the control unit 521. The receiver 520 receives related information of auto-negotiation from the first node device 50. The control unit 521 processes the received information and determines a proper common mode of operation. The transmitter 522 then transmits the determining result to the repeater 53. In addition, the control unit 521 comprises an auto-negotiation advertisement register (ANAR) for storing information indicating modes of operation supported by the repeater 52.

Figure 8:
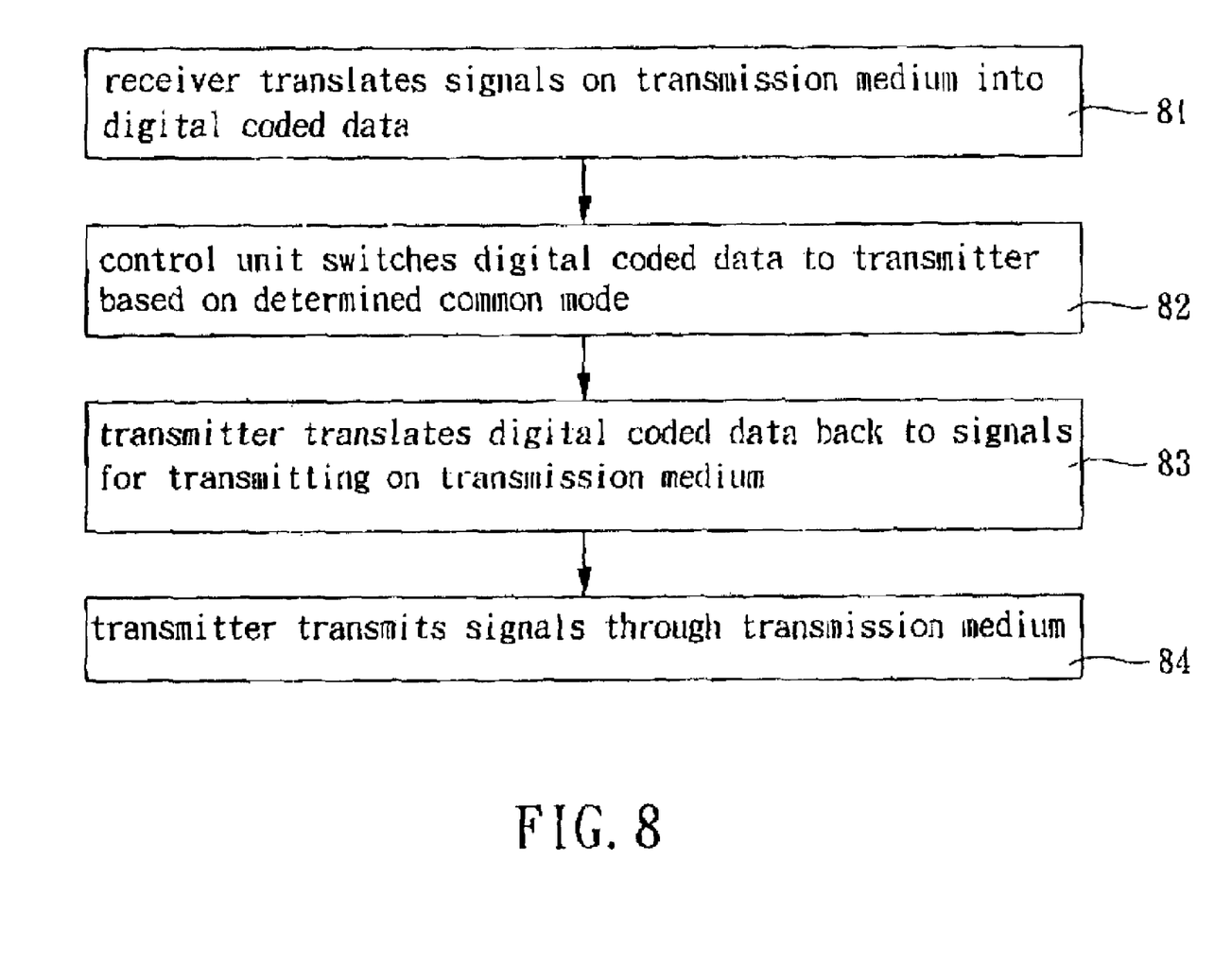
FIG. 8 is a flowchart of signal processing for the repeater of FIG. 7 according to the present invention

After performing auto-negotiation, the repeater 52 can transceive signals on the transmission medium according to the determined common mode of operation. FIG. 8 is a flowchart of signal processing for the repeater 52 of FIG. 7 according to the present invention. As shown in FIG. 8, the flowchart comprises steps of:

81 the receiver 520 translating the signals on the transmission medium into digital coded data;

82 the control unit 521 switching the digital coded data to the transmitter 522 based on the determined common mode of operation;

83 the transmitter 522 translating the digital coded data back to the signals for transmitting on the transmission medium; and 84 the transmitter 522 transmitting the signals through the transmission medium.

While the present invention has been shown and described with reference to preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. A method for performing auto-negotiation between two node devices in a network, wherein at least an auto-negotiating repeater is used to connect the two node devices, the method comprising: selecting a first common mode of operation according to respective modes of operation supported by a first one of the node devices and the repeater; comparing the first common mode of operation with modes of operation supported by a second one of the node devices; and determining a second common mode of operation according to a comparing result, wherein the second common mode of operation is a highest performance common mode of operation for the first and second node devices.

2. The method as recited in claim 1, wherein the node devices comprise a network interface card (NIC).

3. The method as recited in claim 1, wherein the node devices comprise a switch.

4. The method as recited in claim 1, wherein the comparing comprises checking an auto-negotiation advertisement register (ANAR) of the repeater for the modes of operation supported by the repeater.

5. An auto-negotiating repeater, the repeater connecting a first node device and a second node device in a network, comprising: a receiver receiving related information of auto-negotiation of the first node device; a control unit coupled to the receiver, processing the received information and determining a common mode of operation for the first node device and the repeater; and a transmitter coupled to the control unit, transmitting a determining result to the second node device.

6. The repeater as recited in claim 5, wherein the first and second node devices comprise a network interface card (NIC).

7. The repeater as recited in claim 5, wherein the first and second node devices comprise a switch.

8. The repeater as recited in claim 5, wherein the control unit comprises an auto-negotiation advertisement register (ANAR) for storing information indicating modes of operation supported by the repeater.

9. In a network having at least a repeater, a first node device and a second node device, the repeater coupled between the first and the second node devices by a physical, medium, a method for determining a highest performance mode of operation of the first and second node devices, comprising: receiving first auto-negotiation information from the first node device, the first auto-negotiation information indicating modes of operation supported by the first node device; selecting a first common mode of operation according to respective modes of operation supported by the first node device and the repeater; transmitting second auto-negotiation information onto the physical medium, the second auto-negotiation information indicating the first common mode of operation of the first node device and the repeater; receiving third auto-negotiation information from the second node device; and determining the highest performance common mode of operation according to the third auto-negotiation information.

10. The method as recited in claim 9, further comprising a step of transmitting fourth auto-negotiation information onto the physical medium, the fourth auto-negotiation information indicating the highest performance common mode of operation of the repeater, the first and second node devices.

11. The method as recited in claim 9, wherein the second auto-negotiation information stores in an auto-negotiation advertisement register (ANAR) of the repeater.

12. The method as recited in claim 9, wherein the first node device is a network interface card (NIC).

13. The method as recited in claim 9, wherein the first node device is a switch.

* * * * *